United States Patent
Hammoud et al.

(10) Patent No.: US 7,370,970 B2
(45) Date of Patent: May 13, 2008

(54) EYEGLASS DETECTION METHOD

(75) Inventors: Riad I. Hammoud, Kokomo, IN (US); Phillip V. Malawey, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/452,669

(22) Filed: Jun. 14, 2006

(65) Prior Publication Data
US 2007/0291231 A1    Dec. 20, 2007

(51) Int. Cl.
*A61B 3/02* (2006.01)

(52) U.S. Cl. .............. 351/222; 382/103; 382/111; 396/51

(58) Field of Classification Search ........ 351/209–210, 351/222; 382/103; 356/124; 396/51
See application file for complete search history.

(56) References Cited

U.S. PATENT DOCUMENTS
5,293,427 A * 3/1994 Ueno et al. ................ 382/103

OTHER PUBLICATIONS

U.S. Appl. No. 11/076,600, filed Mar. 10, 2005, Hammoud et al.
Heo, Savvides& Vijayakumar, Performance Evaluation of Face Recognition Using Visual and Thermal Imagery with Advanced Correlation Filters; Joint IEEE Int'l Workshop on Object Tracking and Classificaton Beyond the Visible Spectrum; Jun. 20, 2005.

* cited by examiner

*Primary Examiner*—Scott J. Sugarman
*Assistant Examiner*—James R Greece
(74) *Attorney, Agent, or Firm*—Jimmy L. Funke (57) ABSTRACT

The presence of eyeglasses worn by a human subject is detected regardless of whether the subject's head is viewed frontally or in profile. Image data within search windows defined relative to the subject's eye is processed to form linear representations of edge boundaries. Angles formed by intersections of the linear representations are determined and used as a basis for determining if eyeglass lenses are present. When prescribed eyeglass components are detected, the eye detection and tracking routines are configured accordingly.

6 Claims, 7 Drawing Sheets

EYEGLASS DETECTION METHOD

TECHNICAL FIELD

The present invention relates to monitoring a human subject's eyes in a video image, and more particularly to a method of determining whether the subject is wearing eyeglasses.

BACKGROUND OF THE INVENTION

Vision systems frequently entail detecting and tracking a subject's eyes in an image generated by a video camera. In the motor vehicle environment, for example, a camera can be used to generate an image of the driver's face, and portions of the image corresponding to the driver's eyes can be analyzed to assess drive gaze or drowsiness. See, for example, the U.S. Pat. Nos. 5,795,306; 5,878,156; 5,926,251; 6,097,295; 6,130,617; 6,243,015; 6,304,187; and 6,571,002, incorporated herein by reference.

Since a high percentage of people wear some form of eyeglasses when driving, a vehicular vision system must be capable of reliably monitoring the driver's eyes regardless of whether the driver is wearing eyeglasses. And yet eyeglasses complicate eye monitoring because they can significantly change the appearance of the driver. Moreover, eyeglass lenses and frames can obscure the vision system's view of the driver's eyes, and produce glare spots due to reflected ambient and active illumination. While there are special lighting and image processing techniques for addressing the challenges posed by eyeglasses, using these techniques for all drivers would impose an unnecessary burden on the vision processor. Accordingly, what is needed is a simple but reliable way of detecting whether the driver is wearing eyeglasses so that the vision system can be configured accordingly.

SUMMARY OF THE INVENTION

The present invention is directed to a method of monitoring the eyes of a human subject in a stream of video images, including a novel method of reliably determining if the subject is wearing eyeglasses, regardless of whether the subject's head is viewed frontally or in profile. Image data within search windows defined in relation to subject's eye is processed to form linear representations of edge boundaries. Angles formed by intersections of the linear representations are determined and used as a basis for determining if eyeglass lens are present. When prescribed eyeglass components are detected, eye detection and tracking routines are configured accordingly.

DESCRIPTION OF THE PREFERRED EMBODIMENT

Figure 1:
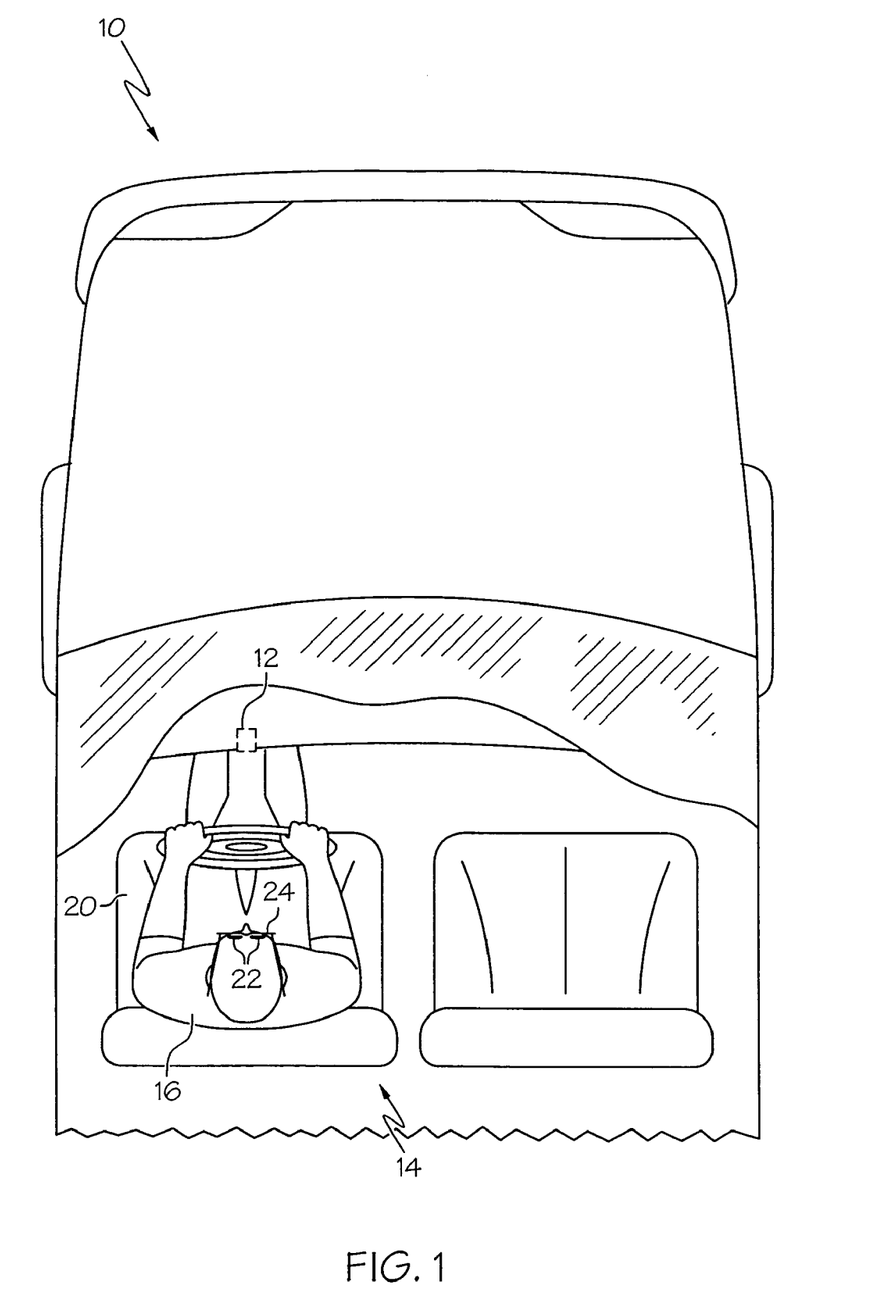
FIG. 1 depicts a diagram of a vehicle equipped with an eye monitoring apparatus according to the present invention.

Referring to FIG. 1, the method of the present invention is disclosed in the context of an eye monitoring apparatus 12 for the driver 16 of a motor vehicle 10. However, it will be recognized that the method of this invention is equally applicable to other vision systems that monitor a human eye, whether vehicular or non-vehicular. In the illustration of FIG. 1, the eye monitoring apparatus 12 is mounted in the passenger compartment 14 of vehicle 10 forward of the driver 16 in a location that affords an unobstructed view of the driver's face when the driver 16 is reposed on the seat 20, taking into account differences in driver height and orientation. In general, the eye monitoring apparatus 12 actively illuminates driver 16 with infrared (IR) light and produces a stream of video images that include the driver's eyes 22. The images are processed to locate the driver's eyes in a given image 22 and to track the eye locations from one image to the next. The state of the eyes 22 can be characterized for various purposes such as detecting driver drowsiness and/or distraction, or even driver gaze.

In the illustration of FIG. 1, the driver 16 is wearing eyeglasses 24, which in general may include regular prescription eyeglasses, safety glasses, sunglasses, goggles, etc. According to this invention, the eye monitoring apparatus 12 processes video images of the driver 16 to determine whether the driver 16 is wearing eyeglasses 24.

Figure 2:
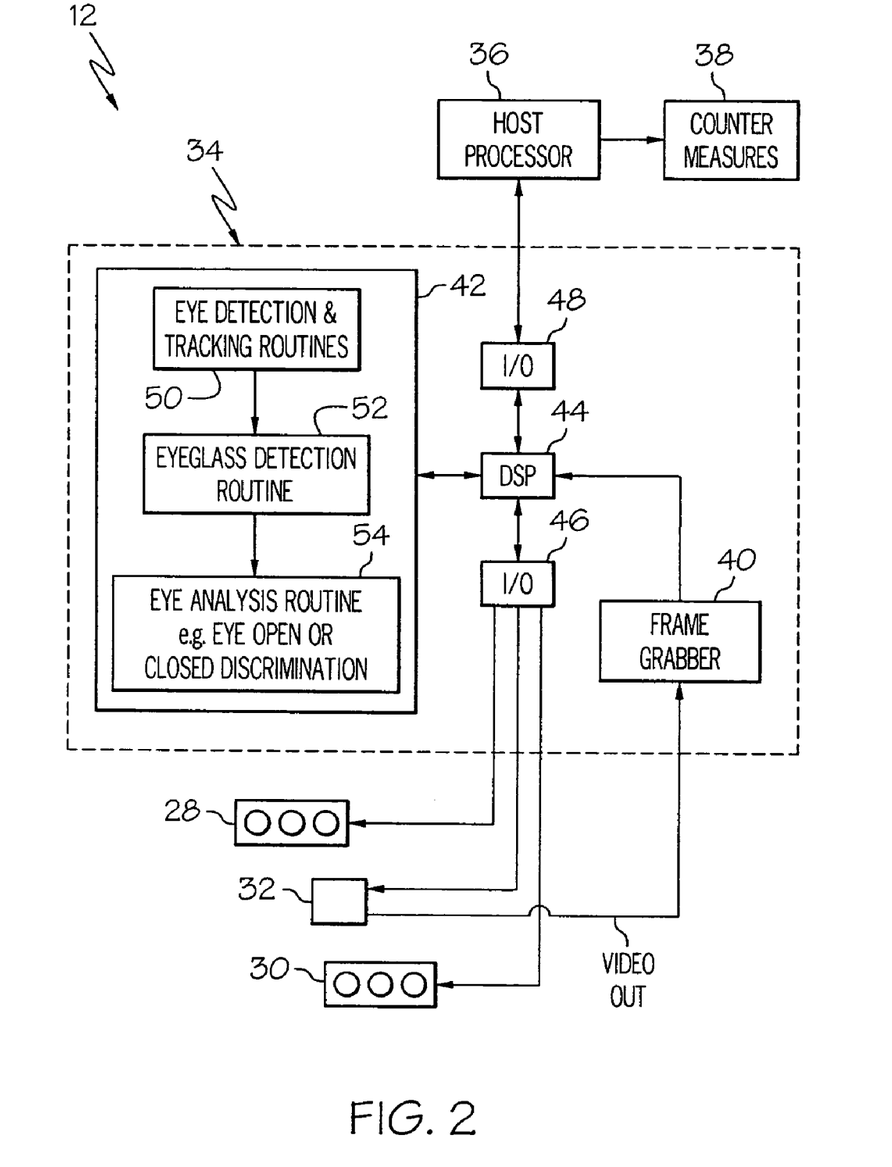
FIG. 2 is a block diagram of the eye monitoring apparatus of FIG. 1, including a video imaging device and a digital signal processor (DSP) for carrying out an eyeglass detection routine according to this invention.

Referring to the block diagram of FIG. 2, the eye monitoring apparatus 12 preferably includes upper and lower IR active illumination devices 28 and 30, a solid-state imaging device 32 focused on the driver's face, and a vision processor 34. In the illustrated embodiment, the apparatus 12 provides eye state information to a remote host processor 36, and the host processor 36 selectively activates one or more counter-measure devices or systems 38 such as an alarm or a braking system if it is determined that the driver's lack of alertness or attention may possibly compromise vehicle safety. The active illumination devices 28 and 30 are individually activated by the vision processor 34 via I/O interface 46, and each comprises an array of IR light emitting diodes as indicated. As described in co-pending U.S. patent application Ser. No. 11/444,841, the active illumination devices 28 and 30 may be individually and alternately activated for successive video frames to shift eyeglass glare away from the driver's eye in at least one-half of the video frames. If the eyeglass detection method of the present invention concludes that the driver 16 is not wearing eyeglasses 24, the active illumination devices 28 and 30 may be activated concurrently for optimal driver illumination and system performance. The vision processor 34 comprises conventional components, including a frame grabber 40 for acquiring video images from imaging device 32, a non-volatile memory 42 for storing various image processing routines, and a digital signal processor (DSP) 44 that selectively executes the routines stored in memory 42 for processing the video images acquired by frame grabber 40. The DSP 44 outputs various control signals to illumination devices 28 and 30 and imaging device 32 via interface 46, and communicates with host processor 37 via interface 48.

The signal processing routines residing in the non-volatile memory 42 include eye detection and tracking routines 50, the eyeglass detection routine 52 of this invention, and an eye analysis routine 54. In general, the detection and tracking routines 50 identify the location of the driver's eyes 22 in a given image frame, and then track the eye locations from one image frame to the next. The routine 52 processes the image data to determine if the driver 16 is wearing eyeglasses 24, and the routine 54 characterizes the state of the driver's eyes (open vs. closed, for example). The eye detection and tracking routines 50, the eye analysis routine 54, and the routines executed by host processor 36 for using the eye state information may comprise any of a number of known processing techniques. The eyeglass detection routine 52 is the subject of the present invention, and is described below in reference to FIGS. 3A-3C and the flow diagrams of FIGS. 4A-4B, 5 and 6.

Figure 3A:
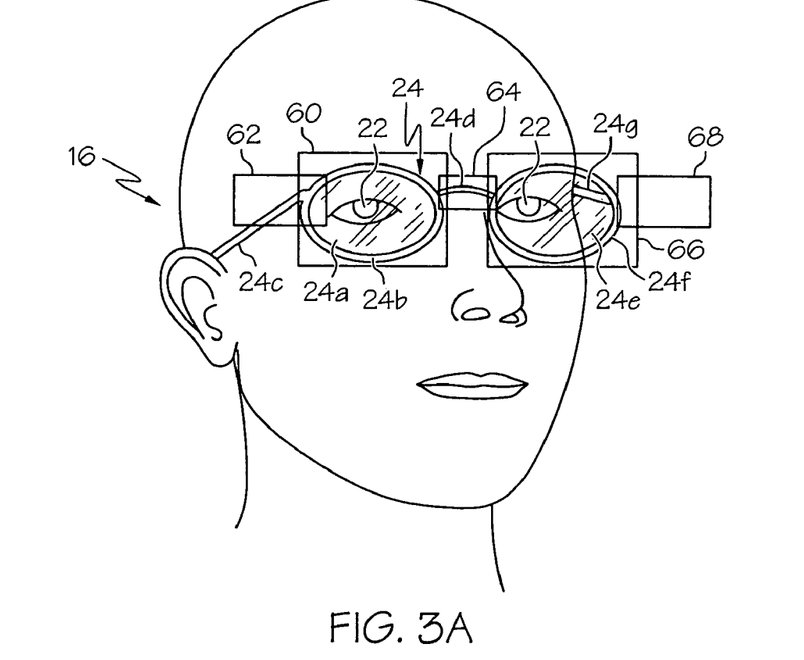
FIG. 3A is diagram of a leftward facing human subject wearing eyeglasses and a set of search windows for eyeglass detection according to the present invention.
Figure 3B:
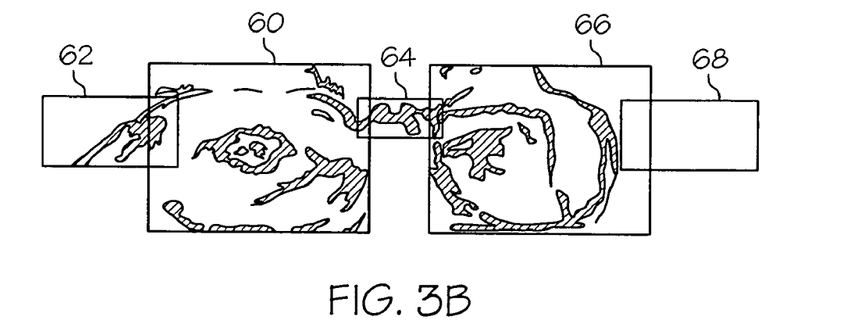
FIG. 3B is a representation of edge boundary data generated by the eye monitoring apparatus of FIG. 1 for the human subject of FIG. 3A according to this invention.
Figure 3C:
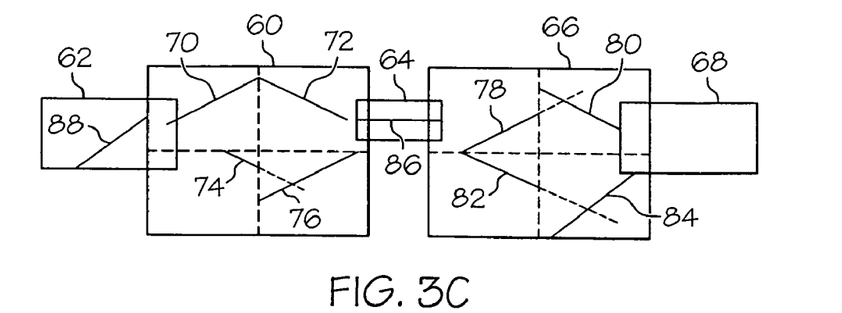
FIG. 3C is a linear representation of the edge boundary data of FIG. 3B for purposes of eyeglass detection.

FIGS. 3A-3C pictorially illustrate the eyeglass detection routine 52 for a condition in which the driver 16 is wearing eyeglasses 24 and facing to the left of the eye monitoring apparatus 12. The eyeglasses 24 include a right lens 24a, a right frame hoop 24b, a right frame arm 24c, a nose bridge 24d, a left lens 24e, a left frame hoop 24f, and a left frame arm 24g. It is assumed for purposes of the illustrations that the detection and tracking routines 50 have successfully located the subject's eyes 22 in a given image frame.

In general, the eyeglass detection routine 52 selects the eye 22 that has been detected with the highest confidence (the driver's right eye in the illustration of FIGS. 3A-3C) and defines a primary eye-sized search window 60 centered on that eye. The image data within the primary search window 60 is processed to determine if an eyeglass frame hoop 24b is present. Next, the routine 52 defines a small secondary search window 62 laterally outboard of the primary search window 60, and processes the image data within that window to determine if a frame arm 24c is present. Next, the routine 52 defines another secondary search window 64 laterally inboard of the primary search window 60, and processes the image data within that window to determine if a nose bridge 24d is present. Next, the routine 52 defines another eye-sized search window 66, and processes the image data within that window to determine if an eyeglass frame hoop 24f is present. The search window 66 can be defined with respect to the other search windows 60-64 as shown, or may be centered on the detected location of the un-selected eye 22 if desired. Finally, the routine 52 defines a small secondary search window 68 laterally outboard of the search window 66, and processes the image data within that window to determine if a frame arm 24g is present. Depending on which eyeglass elements are deemed to be present, the routine 52 determines if the driver 16 is wearing eyeglasses 24, and in some cases the driver's head pose (i.e., forward-facing, right-facing, or left-facing).

Detecting the presence or absence of eyeglass components 24a-24g within the search windows 60-68 is accomplished by applying an edge detection function (such as a Sobel edge detector routine) to the image data within the search windows to identify edge boundaries of the imaged data as represented in FIG. 3B, and then applying a line selection function (such as a Radon-Hough transformation) to the detected edges. If the pixel density of a constructed line is sufficiently high, the line selection function records the line coordinates for eyeglass component detection purposes.

In the small search windows 62, 64 and 68, the presence of a line of sufficient pixel density within a prescribed range of angles indicates the presence of the corresponding eyeglass component. For example, the presence of a frame arm 24c is detected based on the presence of line 88 within search window 62, and the presence of a nose bridge 24d is detected based on the presence of line 86 in search window 64. The search window 68 contains no edge data, and therefore no line segment.

The eye search windows 60 and 66 are divided into sections and processed section-by-section to form a piecewise linear representation of the frame hoops 24b and 24f, if present. In the illustrated embodiment, the search windows 60 and 66 are divided into quadrants as depicted by the dashed bisector lines in FIG. 3C, and the line segments 70-84 represent the outputs of the line selection function for the various search window quadrants. In search window 60, the lines 70, 72, 74 and 76 comprise a piecewise linear representation of the right frame hoop 24b; and in search window 66, the lines 78, 80, 82 and 84 comprise a piecewise linear representation of the left frame hoop 24f. If the interior angles subtended by the lines in the upper and lower search window quadrants are within a defined range such as 110°-160°, an eyeglass lens is detected. For example, the driver's right lens 24a is detected if the interior angle subtended between lines 70 and 72 is in the defined range of angles, and the interior angle subtended between lines 74 and 74 is also in the defined range. Since some eyeglasses lack an upper or lower frame hoop element, a lens can also be detected if only upper quadrant lines or lower quadrant lines are present, provided another eyeglass component such as nose bridge 24d is also detected.

The flow diagrams of FIGS. 4A-4B, 5 and 6 describe the operation of the eye detection routine 52. As mentioned above, it is assumed that the detection and tracking routines 50 have previously located the subject's eyes 22 in a given image frame.

Figure 4A:
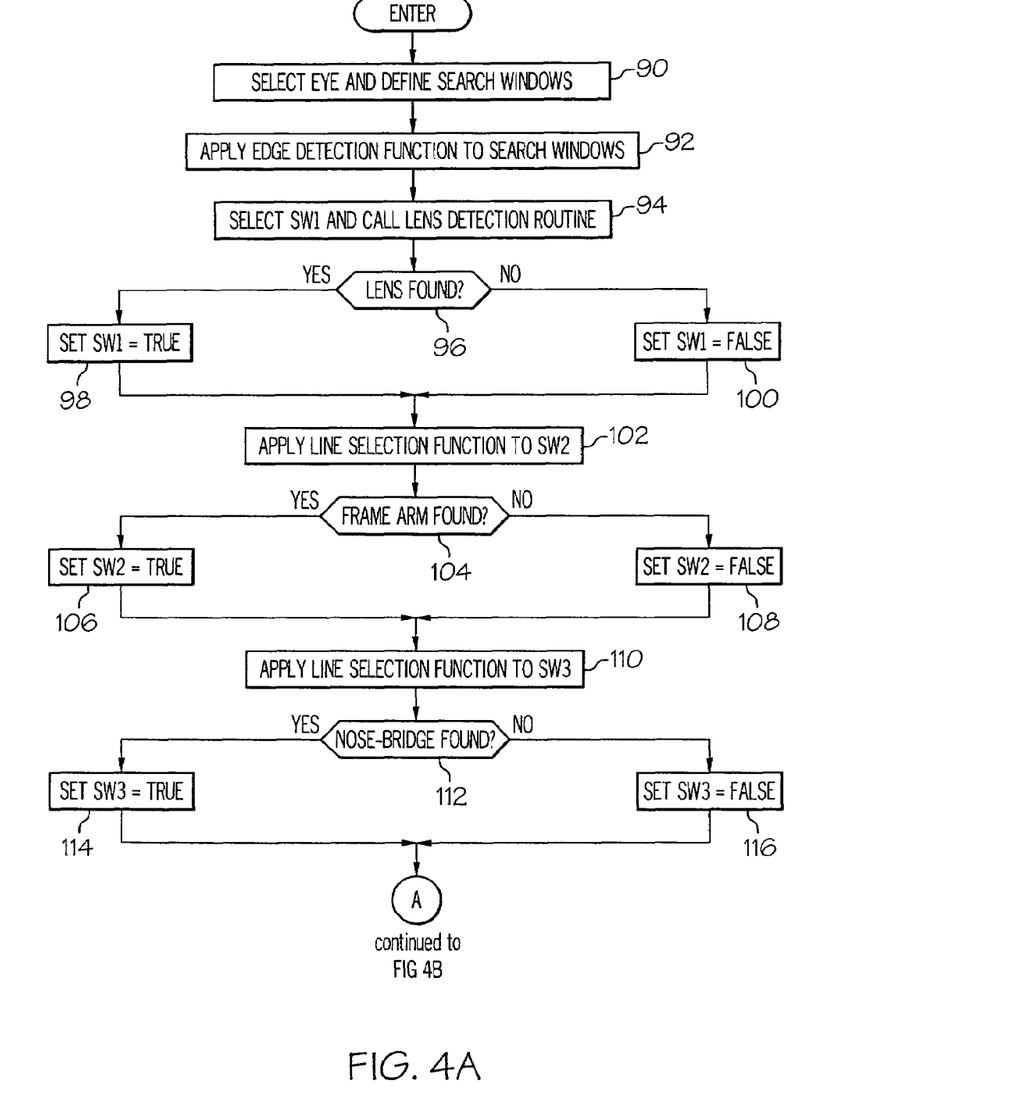
FIGS. 4A and 4B together depict a flow diagram representative of a software routine carried out by the DSP of FIG. 2 for carrying out the eyeglass detection method of the present invention.
Figure 4B:
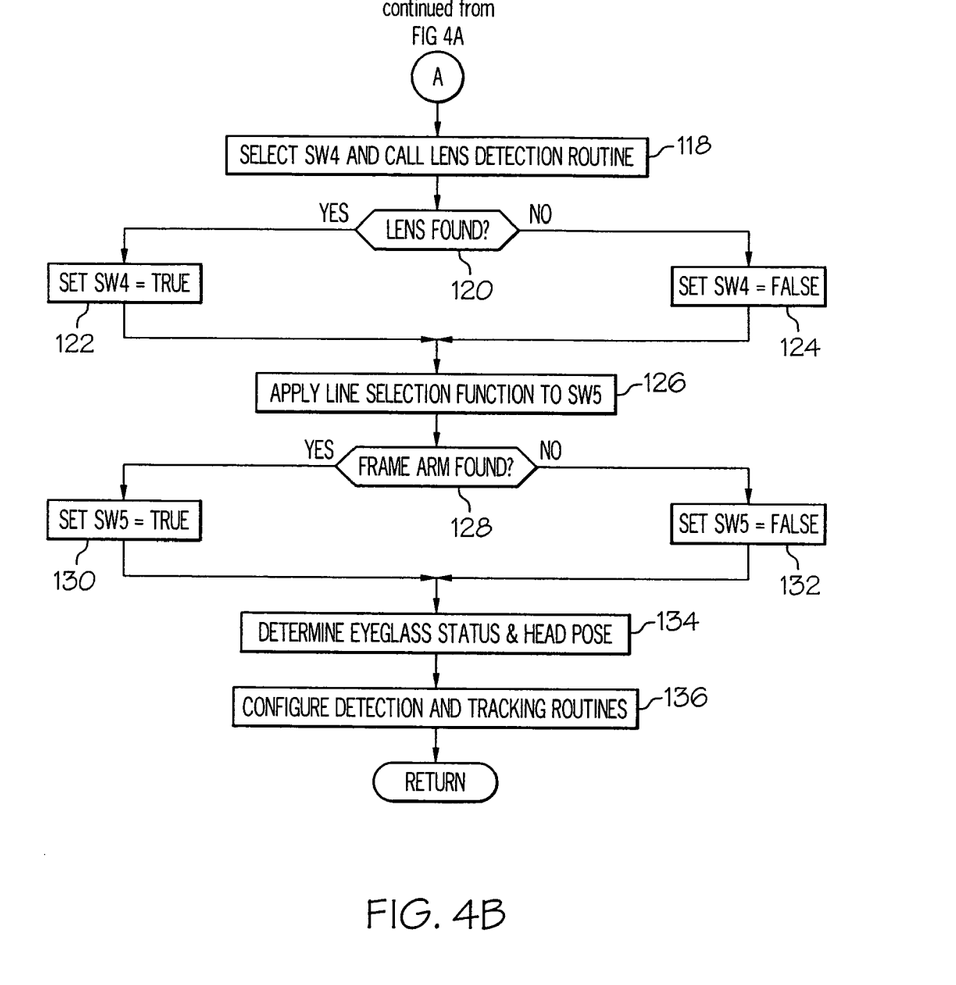

Referring to FIGS. 4A-4B, the block 90 is executed to select one of the detected eyes 22 and to define the search windows 60-68 with respect to the coordinates of that eye. The selected eye may be a predetermined eye such as the driver's left eye, or alternately, the eye that has been detected with the highest confidence. For purposes of the flow diagram, the search window centered on the selected eye (i.e., search window 60 in the example of FIGS. 3A-3C) is designated as SW1. The frame arm search window laterally outboard of SW1 (i.e., search window 62 in the example of FIGS. 3A-3C) is designated as SW2. The nose bridge search window laterally inboard of SW1 (i.e., search window 64 in the example of FIGS. 3A-3C) is designated as SW3. The search window for the unselected eye (i.e., search window 66 in the example of FIGS. 3A-3C) is designated as SW4. The location of SW4 can be defined with respect to SW1 as shown in FIGS. 3A-3C, or may be centered on the detected coordinates of the unselected eye. Finally, the frame arm search window laterally outboard of SW4 (i.e., search window 68 in the example of FIGS. 3A-3C) is designated as SW5.

Following definition of the search windows SW1-SW5, the block 92 is executed to apply an edge detection function (such as a Sobel edge detector) to the image data within the search windows to identify edge boundaries of the imaged data. An example of the result is depicted in FIG. 3B, described above. The blocks 94-132 are then executed to construct linear representations of the edge data in search windows SW1-SW5, to select representative line segments based on the edge data, and to determine if the various eyeglass components are present based on the selected line segments. In the illustrated embodiment, a Radon-Hough transform converts the edge data from Cartesian coordinates to polar space to construct line segments representative of the edge boundaries. Alternately, the line segments may be generated using a least-squares method, or some other line-fitting technique. Line segments having at least a minimum pixel density and that fall within prescribed angles representative of the respective eyeglass component are identified, and the identified segment having the highest pixel density is selected and recorded. If the recorded line segment is within prescribed constraints, the respective eyeglass component is detected.

Figure 5:
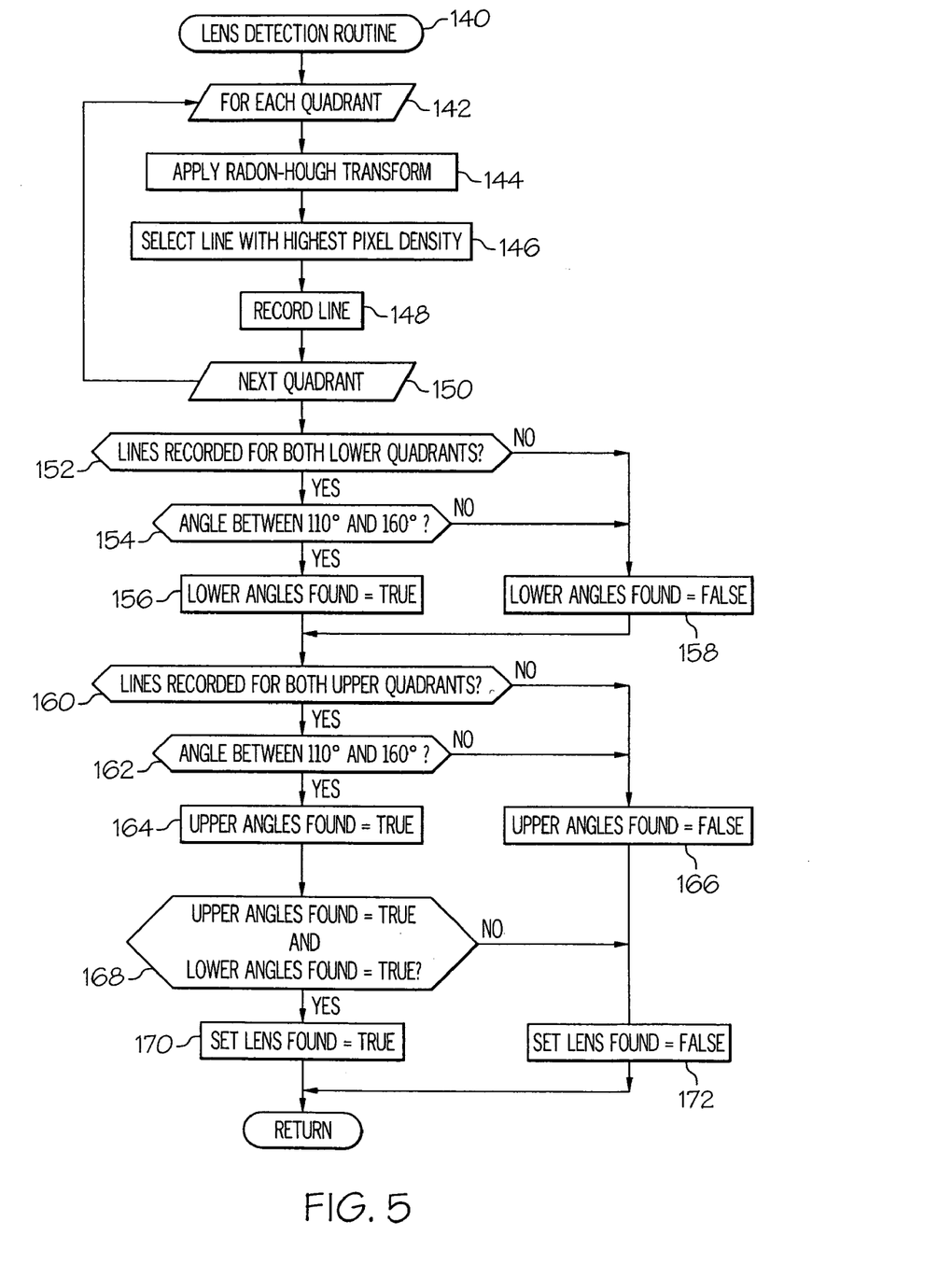
FIG. 5 depicts a flow diagram detailing a lens detection routine called by the flow diagram of FIGS. 4A-4B.

As indicated at blocks 94 and 118, the lens detection routine 140 of FIG. 5 is executed to determine if an eyeglass lens is present within each of the eye search windows SW1 and SW4. Referring to FIG. 5, the blocks 144, 146 and 148 are executed for each quadrant of the respective eye search window SW1 or SW4, as indicated by blocks 142 and 150. The block 144 applies a Radon-Hough transform to the edge data of a respective quadrant to construct and identify representative line segments, the block 146 selects the line segment having the highest pixel density, and block 148 records the selected line segment. Once the blocks 144-148 have been executed for each quadrant of the respective search window SW1 or SW4, the blocks 152-172 are executed to determine if an eyeglass lens is present. Blocks 152 and 154 determine if line segments have been recorded for both lower quadrants of the search window and the angle subtended between them is between 110° and 160°. If so, block 156 sets the state of the LOWER ANGLES FOUND flag to True; if not, block 158 sets the state of LOWER ANGLES FOUND to False. Similarly, blocks 160 and 162 determine if line segments have been recorded for both upper quadrants of the search window and the angle subtended between them is between 110° and 160°. If so, block 164 sets the state of the UPPER ANGLES FOUND flag to True; if not, block 166 sets the state of UPPER ANGLES FOUND to False. Block 168 then determines if both LOWER ANGLES FOUND and UPPER ANGLES FOUND are True. If so, an eyeglass lens is detected, and block 170 sets the state of the LENS FOUND flag to True; otherwise, block 172 sets the state of LENS FOUND to False, indicating that a lens was not detected.

Returning to the flow diagram of FIGS. 4A-4B, the block 96 checks the status of the LENS FOUND flag following execution of the lens detection routine 140 with respect to eye search window SW1. If a lens was detected (i.e., if LENS FOUND=True), the block 98 sets the flag SW1 to True. If a lens was not detected (i.e., if LENS FOUND=False), the block 100 sets the flag SW1 to False. The block 102 then applies the line selection function (as described above in respect to blocks 144-148 of FIG. 5) to the edge data of the frame arm search window SW2. Block 104 examines the line segment, if any, selected and recorded by the line selection function to determine if an eyeglass frame arm 24c is present. If the frame arm 24c is found, the block 106 sets the flag SW2 to True; otherwise, the block 108 sets the flag SW1 to False. The block 110 then applies the line selection function to the edge data of the nose bridge search window SW3. Block 112 examines the line segment, if any, selected and recorded by the line selection function to determine if an eyeglass nose bridge 24d is present. If the nose bridge 24d is found, the block 114 sets the flag SW3 to True; otherwise, the block 116 sets SW3 to False. The block 118 then calls the lens detection routine 140 of FIG. 5 with respect to eye search window SW4. The block 120 checks the status of the LENS FOUND flag following execution of the lens detection routine 140, and block 122 sets the flag SW4 to True if a lens was detected (i.e., if LENS FOUND=True). If a lens was not detected (i.e., if LENS FOUND=False), the block 124 sets the flag SW4 to False. Finally, block 126 applies the line selection function to the edge data of the frame arm search window SW5. Block 128 examines the line segment, if any, selected and recorded by the line selection function to determine if an eyeglass frame arm 24g is present. If the frame arm 24g is found, the block 130 sets the flag SW5 to True; otherwise, the block 132 sets SW5 to False.

After the state of the search window flags SW1-SW5 have been determined, the block 134 determines the eyeglass status and driver head pose, and the block 136 configures the detection and tracking routines 50 accordingly. The eyeglass status and head pose determination of block 134 is detailed by the flow diagram of FIG. 6.

Figure 6:
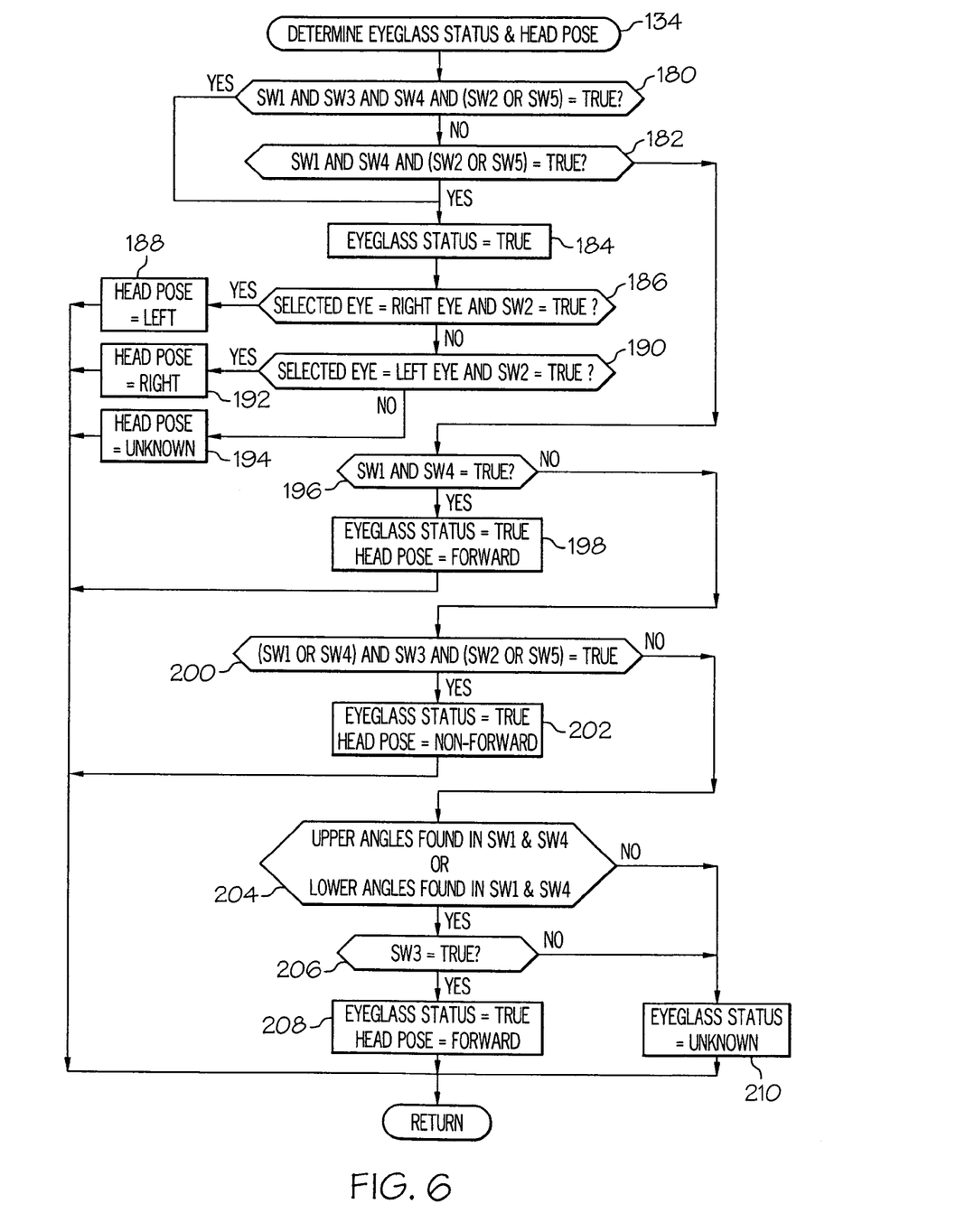
FIG. 6 depicts a flow diagram detailing a portion of the flow diagram of FIGS. 4A-4B pertaining to determining eyeglass status and head pose.

Referring to FIG. 6, the blocks 180-210 determine eyeglass status and driver head pose for a number of different situations. In certain cases, eyeglasses are deemed to be present and the EYEGLASS STATUS flag is set to True; in other cases, the information is deemed to be insufficient to confidently conclude that eyeglasses are present and EYEGLASS STATUS is set to Unknown. If EYEGLASS STATUS is True and driver head pose is detectable, the HEAD POSE flag is set to Right, Left or Forward. In some cases the routine can only conclude that the head pose is Non-Forward, and in other cases the head pose is Unknown.

The block 180 checks for an ideal non-forward head pose situation in which both lenses 24a, 24b, a nose bridge 24d, and an ear frame 24c or 24g are detected. In other words, the flags SW1-SW5 satisfy the Boolean statement: SW1 AND SW3 AND SW4 AND (SW2 OR SW5)=True. If the condition is met, block 184 sets EYEGLASS STATUS to True. If the condition is not met, block 182 checks for a non-forward head pose situation in which both lenses 24a, 24b and an ear frame 24c or 24g are detected. If the condition is met, block 184 likewise sets EYEGLASS STATUS to True. If either condition is met, the blocks 186-194 determine and designate head pose. The block 186 determines if the selected eye is the driver's right eye and the detected ear frame is in search window SW2. This is the condition shown in the example of FIGS. 3A-3C; if the condition is satisfied, block 188 sets HEAD POSE to Left to complete the routine. Conversely, the block 190 determines if the selected eye is the driver's left eye and the detected ear frame is in search window SW5. If the condition is satisfied, block 192 sets HEAD POSE to Right to complete the routine. If neither of the blocks 186 and 190 are answered in the affirmative, head pose cannot be confidently determined and the block 194 sets HEAD POSE to Unknown to complete the routine.

If neither of the non-forward head pose conditions defined by blocks 180 and 182 are met, the block 196 checks for a forward-facing head pose condition in which both lenses 24a and 24b are detected (i.e., SW1 AND SW4=True). If the condition is satisfied, block 198 sets EYEGLASS STATUS to True and HEAD POSE to Forward, completing the routine. If the condition is not satisfied, block 200 checks for a non-forward head pose condition in which one lens 24a or 24e, a nose bridge 24d, and one ear frame 24c or 24g are detected. That is: (SW1 OR SW4) AND SW3 AND (SW2 OR SW5)=True. If the condition is met, block 202 sets EYEGLASS STATUS to True and HEAD POSE to Non- Forward, completing the routine. If the condition is not satisfied, blocks 204 and 206 check for a special condition that can occur in eyeglasses where only the upper or lower half of lenses 24a, 24e are bounded by a frame hoop 24b, 24f. Block 204 determines if just upper angles or just lower angles were found in both of the eye search windows SW1 and SW4. If so, block 206 determines if a nose bridge 24d was also found. If both conditions are met, the block 208 sets EYEGLASS STATUS to True and HEAD POSE to Unknown, completing the routine. If either of the blocks 204 and 206 is answered in the negative, the block 210 is executed to set EYEGLASS STATUS to Unknown, completing the routine.

In summary, the present invention provides a way of reliably detecting the presence of eyeglasses on a human subject. Knowing whether eyeglasses are present can significantly streamline eye detection and tracking routines, thereby enhancing eye monitoring performance and accuracy. For example, glare detection and elimination techniques need only be used when eyeglasses are detected. Also, the detection and tracking confidence may be lowered when eyeglasses are detected to reflect the reduced visibility of the subject's eyes through eyeglass lenses. Moreover, appearance models for eye vs. non-eye discrimination can be selected on the basis of the eyeglass status. Additionally, the head pose when detected can be used to confirm driver eye gaze determinations.

While the present invention has been described with respect to the illustrated embodiment, it is recognized that numerous modifications and variations in addition to those mentioned herein will occur to those skilled in the art. For example, the prescribed angle ranges may be different than mentioned herein, the eye search windows may be divided into a different number of regions than shown, and so on. Accordingly, it is intended that the invention not be limited to the disclosed embodiment, but that it have the full scope permitted by the language of the following claims.

The invention claimed is:

1. A method of determining whether a human subject is wearing eyeglasses based on a digital image of the subject, comprising the steps of:

defining at least one digital image search window centered on an eye of the subject and a set of search regions corresponding to different eyeglass frame components, including a first search window corresponding to a first lens and frame hoop a second search window corresponding to a second lens and frame hoop, a third search window corresponding to a nose bridge, a fourth search window corresponding to a first arm, and a fifth search window corresponding to a second arm;

identifying edge boundaries of digital data within said search regions, and generating linear representations of said edge boundaries;

detecting if said eyeglass frame components are present within respective search regions based on the generated linear representations, where presence of lenses and frame hoops are determined by calculating at least one angle formed by intersections of said linear representations; and comparing said at least one angle with a prescribed range of angles;

determining that said subject is wearing eyeglasses when said first lens and frame hoop and said second lens and frame hoop are detected; and determining that a head pose of said subject is forward-facing when it is determined that said subject is wearing eyeglasses, but neither said first arm nor said second arm is detected.

2. The method of claim 1, where said linear representations form a piecewise linear representation of said eyeglass lenses and frame hoops.

3. The method of claim 1, including the step of:

when it is determined that said subject is wearing eyeglasses, determining that a head pose of said subject is leftward-facing or rightward-facing based on which of said first and said second arms is detected.

4. The method of claim 1, including the step of:

determining that said subject is wearing eyeglasses when said first lens and frame hoop, said nose bridge, and one of said first and second arms are detected.

5. The method of claim 1, including the step of:

dividing each of said first and second search regions into quadrants, including two upper quadrants and two lower quadrants;

generating linear representations of said edge boundaries in each of said quadrants;

calculating a first angle formed by intersections of the linear representations in said upper quadrants and a second angle formed by intersections of the linear representations in said lower quadrants; and determining that said subject is wearing eyeglasses when said nose bridge is detected, and said first or second angles for both of said first and second search windows are within a prescribed range of angles.

6. The method of claim 1, wherein:

said at least one angle is an interior angle; and said prescribed range of angles is approximately 110° to approximately 160°.

* * * * *